(12) United States Patent
Fischer

(10) Patent No.: US 10,710,274 B2
(45) Date of Patent: Jul. 14, 2020

(54) METHOD FOR PRODUCING A THERMOPLASTIC MOULDING COMPOUND

(71) Applicant: INEOS STYROLUTION GROUP GMBH, Frankfurt am Main (DE)

(72) Inventor: Wolfgang Fischer, Walldorf (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 63 days.

(21) Appl. No.: 16/099,710

(22) PCT Filed: May 4, 2017

(86) PCT No.: PCT/EP2017/060619
§ 371 (c)(1),
(2) Date: Nov. 8, 2018

(87) PCT Pub. No.: WO2017/194380
PCT Pub. Date: Nov. 16, 2017

(65) Prior Publication Data
US 2019/0193302 A1 Jun. 27, 2019

(30) Foreign Application Priority Data
May 10, 2016 (EP) ..................................... 16168844

(51) Int. Cl.
*B29C 48/80* (2019.01)
*B29B 7/84* (2006.01)
(Continued)

(52) U.S. Cl.
CPC ................ *B29B 7/845* (2013.01); *B29B 7/48* (2013.01); *B29B 7/488* (2013.01); *B29B 7/823* (2013.01);
(Continued)

(58) Field of Classification Search
CPC . C08L 25/12; C08L 9/10; C08L 13/02; B29B 7/845; B29C 48/767; B29C 48/762; B29C 48/834
See application file for complete search history.

(56) References Cited

U.S. PATENT DOCUMENTS 5,302,635 A 4/1994 Brinkmann et al.
5,358,693 A 10/1994 Brinkmann et al.
(Continued)

FOREIGN PATENT DOCUMENTS

DE 2359901 A1 6/1974
DE 19728629 A1 1/1999
(Continued)

OTHER PUBLICATIONS

English translation of International Preliminary Report on Patentability in International Application No. PCT/EP2017/060619, dated Nov. 15, 2018.

*Primary Examiner* — Vu A Nguyen
(74) *Attorney, Agent, or Firm* — J. A. Lindeman & Co. PLLC

(57) ABSTRACT

A method for producing a thermoplastic moulding compound by means of an extruder (10), which comprises at least one feed zone (20), at least one mixing section (30), at least one venting section (40) and at least one discharge zone (50), wherein in the at least one feed zone (20) a water-containing first component and a second component are supplied, in the at least one mixing section (30) the thermoplastic moulding compound is mixed and contained water is evaporated, in the at least one venting section (40) water vapour is removed from the moulding compound and in the at least one discharge zone (50) the moulding compound is discharged. At least one of the mixing housings (31, 32) is kept at a temperature that is equal to or lower than the (Continued)

temperature of the moulding compound within the mixing section (30).

13 Claims, 1 Drawing Sheet

(51) Int. Cl.

| | |
|---|---|
| *B29C 48/76* | (2019.01) |
| *C08L 25/12* | (2006.01) |
| *C08L 9/10* | (2006.01) |
| *C08L 13/02* | (2006.01) |
| *B29B 7/82* | (2006.01) |
| *B29B 7/48* | (2006.01) |
| *B29C 48/82* | (2019.01) |
| *B29C 48/875* | (2019.01) |
| *C08J 3/00* | (2006.01) |
| *C08J 3/20* | (2006.01) |
| *C08J 3/21* | (2006.01) |
| *C08L 9/00* | (2006.01) |
| *C08L 33/06* | (2006.01) |
| *C08L 33/20* | (2006.01) |
| *B29K 21/00* | (2006.01) |
| *B29C 48/25* | (2019.01) |
| *B29K 9/06* | (2006.01) |
| *B29C 48/29* | (2019.01) |
| *B29C 48/03* | (2019.01) |
| *B29B 9/06* | (2006.01) |

(52) U.S. Cl.
CPC ............ *B29B 7/842* (2013.01); *B29C 48/762* (2019.02); *B29C 48/767* (2019.02); *B29C 48/82* (2019.02); *B29C 48/834* (2019.02); *B29C 48/875* (2019.02); *C08J 3/005* (2013.01); *C08J 3/203* (2013.01); *C08J 3/21* (2013.01); *C08L 9/00* (2013.01); *C08L 25/12* (2013.01); *C08L 33/06* (2013.01); *C08L 33/20* (2013.01); *B29B 9/065* (2013.01); *B29C 48/03* (2019.02); *B29C 48/2565* (2019.02); *B29C 48/29* (2019.02); *B29K 2009/06* (2013.01); *B29K 2021/00* (2013.01); *B29K 2021/003* (2013.01); *C08J 2309/00* (2013.01); *C08J 2325/12* (2013.01); *C08J 2333/08* (2013.01)

(56) References Cited

U.S. PATENT DOCUMENTS

| | | |
|---|---|---|
| 5,851,463 A | 12/1998 | Guntherberg et al. |
| 6,165,399 A | 12/2000 | Guntherberg et al. |
| 6,323,279 B1 | 11/2001 | Guntherberg et al. |
| 2003/0183979 A1 | 10/2003 | Guntherberg et al. |
| 2004/0102564 A1 | 5/2004 | Guntherberg et al. |
| 2006/0034962 A1* | 2/2006 | Guntherberg ......... B29B 7/7495 425/208 |
| 2016/0243728 A1 | 8/2016 | Fischer et al. |

FOREIGN PATENT DOCUMENTS

| | | |
|---|---|---|
| DE | 10058133 A1 | 5/2002 |
| EP | 0490056 A1 | 10/1991 |
| EP | 0735077 A1 | 3/1996 |
| EP | 1400337 A1 | 9/2002 |
| GB | 1442661 A | 7/1976 |
| JP | S57167303 A | 10/1982 |
| JP | S60222223 A | 11/1985 |
| JP | H02286208 A | 11/1990 |
| WO | 98/13412 A1 | 4/1998 |
| WO | 02/28618 A1 | 4/2002 |
| WO | 2004/028781 A1 | 4/2004 |
| WO | 2009/103714 A2 | 8/2009 |
| WO | 2015/004112 A1 | 1/2015 |

\* cited by examiner

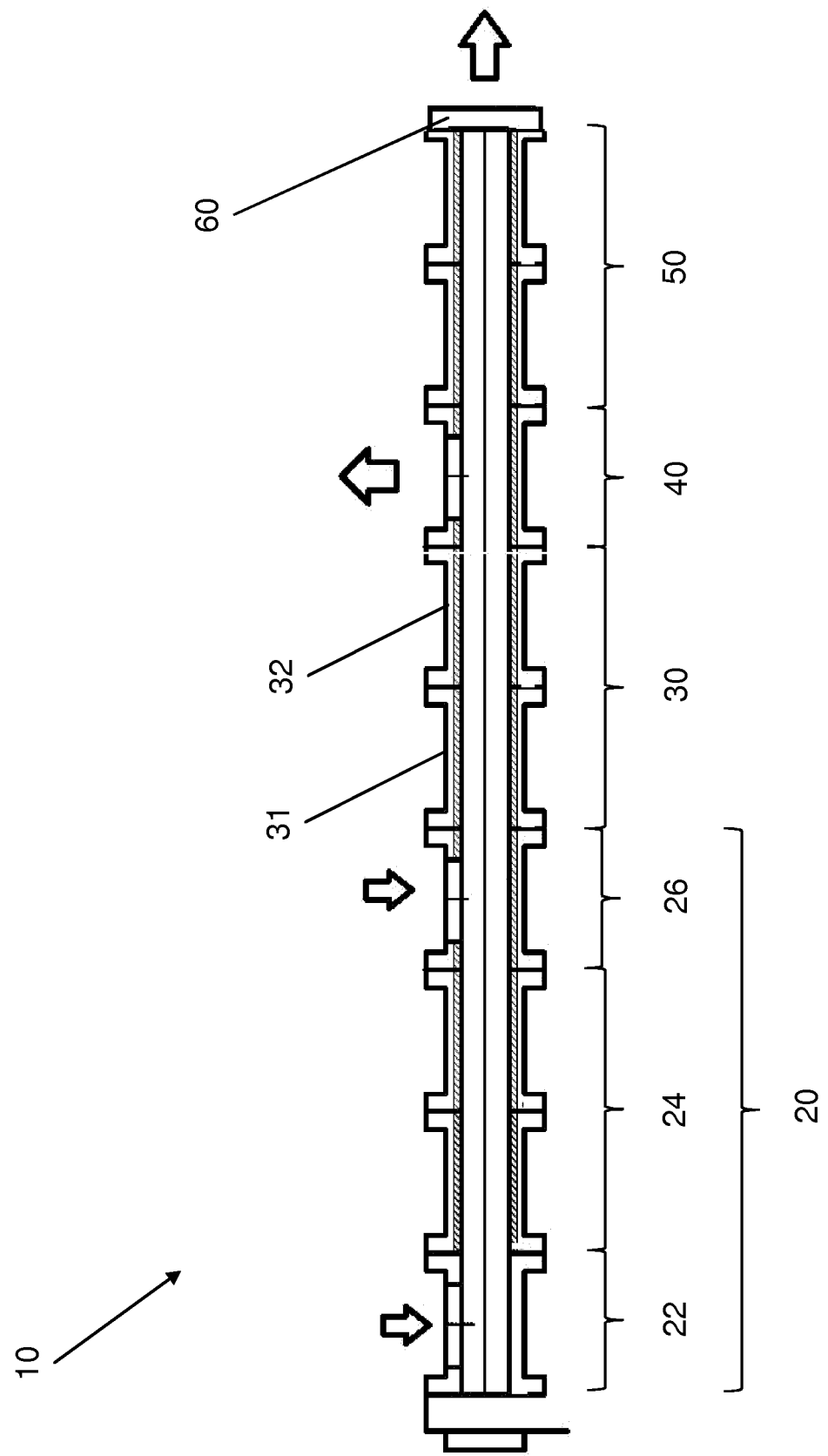

METHOD FOR PRODUCING A THERMOPLASTIC MOULDING COMPOUND

The present invention relates to a process for the production of a thermoplastic molding composition by means of an extruder, where the extruder comprises a feed zone, a mixing section, a venting section and a discharge zone. In the feed zone here a water-containing first component of the thermoplastic molding composition, and also a second component of the thermoplastic molding composition, are introduced, in the mixing section the thermoplastic molding composition is mixed and water present is evaporated, in the venting section water vapor is removed from the thermoplastic molding composition, and in the discharge zone the thermoplastic molding composition is discharged. The present invention further relates to a thermoplastic molding composition produced (or which can be produced) by the process of the invention, and also to moldings.

It is known from the prior art that an extruder, in particular a twin-screw extruder, can be used to produce thermoplastic (co)polymers, for example acrylonitrile-butadiene-styrene (ABS) or acrylonitrile-styrene-acrylate (ASA). The starting materials here, in particular styrene-acrylonitrile copolymer (SAN) and polybutadiene and, respectively, acrylate rubber, are introduced into an extruder. Within the extruder, the starting materials are melted and mixed or dispersed to give a molding composition or a polymer blend. The polybutadiene and, respectively, the acrylate rubber introduced here is dispersed in a styrene-acrylonitrile matrix.

WO 2009/103714 discloses a twin-screw extruder for the extrusion of molding compositions. The twin-screw extruder here comprises two screws corotating within a barrel. The twin-screw extruder further comprises a feed zone, a transition zone and a discharge zone. The starting materials are introduced into the feed zone, which for this purpose has an inlet aperture. The starting materials here can be in solid form, in particular in the form of pellets, but can also be introduced into the feed zone in molten, and therefore viscous, form. The two screws accept the starting materials in the feed zone, and provide onward conveying and compaction of same. In the transition zone, which follows the feed zone, the molding composition is melted and homogenized. In the discharge zone, further homogenization of the molten molding composition takes place. Any remaining residues of solid particles are melted. Uniform distribution of the component materials is moreover achieved. The melt is also brought to a uniform temperature. In the discharge zone, the pressure required for pelletization is moreover generated.

WO 1998/13412 describes screw-based machines which have at least one squeeze section with at least one baffle and, associated therewith, a dewatering aperture upstream of the first baffle. The screw-based machines moreover comprise venting sections after the final plastifying section. The venting apertures and dewatering apertures can have a device that prevents escape of extrusion material. Retaining screws are described as preferred for that purpose.

It is also known that screw-based machines can be used for the devolatilization and dewatering of thermoplastic molding compositions. EP-A 0735077 describes the production of impact-modified thermoplastics via mechanical dewatering of an elastomeric component and mixing with a thermoplastic polymer in a screw-based machine. The dewatering apertures have retaining screws and are operated under superatmospheric pressure.

JP S02-286208 (1990) discloses three different dewatering processes by means of an extruder having two screws. In each case, moisture in liquid form and also in gaseous form is removed from the extrusion composition by way of strainer cages.

In the document JP H57-167303 (1982), an extrusion composition, in this case by way of example slurries of polymer particles, is added into a twin-screw extruder, dewatered, devolatilized and kneaded. Water in liquid form can escape from the extruder upstream of the compression zone. Residual moisture can escape in gaseous form. Strainer cages are used as dewatering apertures.

JP H60-222223 (1985) discloses a process where water in liquid form is removed from an extrusion material, preferably a food, or else another material. The dewatering is achieved by means of a twin-screw extruder. The moisture is discharged in reverse direction through an aperture connected to a vacuum pump.

WO 2004/028781 reveals a device for the extrusion of thermoplastics, in particular a screw-based machine. The device here comprises a venting aperture and a dewatering aperture equipped by way of example with a wire mesh.

WO 2015/004112 discloses a process of the same general type for the production of thermoplastic molding compositions by means of an extruder. The extruder here comprises inter alia an addition section where a water-containing rubber is introduced, a squeeze section where the rubber is to some extent dewatered, and an input section where a styrene-acrylonitrile copolymer (SAN) is introduced. The rubber and the styrene-acrylonitrile copolymer (SAN) are then mixed to give the thermoplastic molding composition. The extruder further comprises a plastifying section or mixing section where the thermoplastic molding composition is mixed, with resultant evaporation of water that is present, a venting section where water vapor is removed from the thermoplastic molding composition, and a discharge zone where the thermoplastic molding composition is discharged. An extruder screw rotates within the extruder.

The temperature of the thermoplastic molding composition within the extruder here, in particular within the mixing section, is by way of example from 220 to 240° C., e.g. 230° C. This temperature is achieved mainly through introduction of heat via mechanical energy introduced from the rotating extruder screw. It is also usual to provide external heating to barrel sections of the extruder.

The rubber introduced can comprise salts dissolved in the water that is present. On evaporation of the water, salt particles of varying size therefore arise. The evaporation of the water takes place inter alia in the mixing section.

In the discharge zone, the larger salt particles can then at least to some extent block perforations in a pelletizing die or a die plate. In the case of strand pelletization, this reduces the diameter of a discharged filament. Once the diameter of the discharged filament has been excessively reduced, break-off of the filament can occur. In the case of underwater pelletization, again the diameter of the discharged thermoplastic molding composition is reduced. Chopping therefore produces pellets with reduced volume and reduced mass. Another term used for these reduced-size pellets is "undersized".

If relatively large salt particles in the discharge zone succeed in passing through the perforations of the pelletizing die, these are then present in the pelletized thermoplastic molding composition discharged and are visible as surface defects, in particular if the thermoplastic molding composition is further processed to give thin films. On contact with warm water, the relatively small salt particles can also then swell and form salt specks which are likewise visible in the form of surface defects on the thermoplastic molding composition.

An object on which the invention is based is to reduce blockage of perforations of a pelletizing die in the discharge zone of an extruder and to avoid formation of salt specks in the discharged (pelletized) thermoplastic molding composition.

Said object is achieved in the invention via a process for the production of a thermoplastic molding composition by means of an extruder with the features of claim 1.

Various thermoplastic molding compositions and thermoplastics have been known for some years to the person skilled in the art, examples being polyamides, polycarbonates, styrene polymers, styrene copolymers and mixtures of these polymers. Among the styrene copolymers are by way of example styrene/acrylonitrile copolymers (SAN), and rubber-modified styrene copolymers, for example acrylonitrile-butadiene-styrene (ABS) and acrylonitrile-styrene-acrylate (ASA).

A process of the same general type for the production of a thermoplastic molding composition uses an extruder which comprises at least one feed zone, at least one mixing section, at least one venting section and at least one discharge zone. In the at least one feed zone here a water-containing first component of the thermoplastic molding composition, and also a second component of the thermoplastic molding composition are introduced, in the at least one mixing section the thermoplastic molding composition is mixed and water present is evaporated, in the at least one venting section water vapor is removed from the thermoplastic molding composition, and in the at least one discharge zone the thermoplastic molding composition is discharged. For this purpose, the discharge zone has by way of example a pelletizing die, through the perforations of which the thermoplastic molding composition is discharged.

In the invention, at least one of the mixing barrel sections of the mixing section here is maintained at a temperature which is the same as or lower then the temperature of the thermoplastic molding composition within the mixing section.

It is preferable here that the mixing barrel sections of the mixing section are entirely maintained at a temperature which is the same as or lower than the temperature of the thermoplastic molding composition within the mixing section.

The mixing barrel section of the mixing section can by way of example be maintained at the same or a lower temperature without any active heating of the mixing barrel section of the mixing section. The mixing barrel section can therefore be operated adiabatically. However, it is also possible to use air-cooling or liquid-cooling for active cooling of the mixing barrel section of the mixing section.

Surprisingly, it has been found that when at least one of the mixing barrel sections of the mixing section is maintained at a temperature which is the same as or lower than the temperature of the thermoplastic molding composition within the mixing section, evaporation of the water produces only relatively small salt crystals that remain in the thermoplastic molding composition. These relatively small salt crystals can pass through the perforations of the pelletizing die of the discharge zone without blockage of same. The relatively small salt crystals also have homogeneous distribution in the thermoplastic molding composition and, even after contact with water, form no visible salt specks on the surface of the thermoplastic molding composition.

The temperature at which at least one of the mixing barrel sections of the mixing section is maintained is advantageously lower by at least 10 K than the temperature of the thermoplastic molding composition within the mixing section. It is preferable that the temperature at which at least one of the mixing barrel sections of the mixing section is maintained is lower by at least 20 K than the temperature of the thermoplastic molding composition within the mixing section.

In an advantageous embodiment of the invention, at least one barrel section of the venting section is heated in a manner such that the temperature of the barrel section of the venting section is higher than the temperature at least of one mixing barrel section of the mixing section.

In another advantageous embodiment of the invention, at least one barrel section of the discharge zone is heated in a manner such that the temperature of the barrel section of the discharge zone is higher than the temperature at least of one mixing barrel section of the mixing section.

In yet another advantageous embodiment of the invention, at least one barrel section of the feed zone is heated in a manner such that the temperature of the barrel section of the feed zone is higher than the temperature at least of one mixing barrel section of the mixing section.

In a possible embodiment of the invention, the water-containing first component of the thermoplastic molding composition and the second component of the thermoplastic molding composition can be introduced together in the feed zone of the extruder.

In an advantageous further development of the invention, the at least one feed zone of the extruder comprises at least one addition section, at least one squeeze section and at least one input section. In the at least one addition section here a water-containing first component of the thermoplastic molding composition is introduced, in the at least one squeeze section the first component of the thermoplastic molding composition is to some extent dewatered, and in the at least one input section a second component of the thermoplastic molding composition is introduced.

In another advantageous embodiment of the invention, at least one barrel section of the input section is heated in a manner such that the temperature of the barrel section of the input section is higher than the temperature at least of one mixing barrel section of the mixing section.

The first component of the thermoplastic molding composition, which is introduced into the addition section of the feed zone of the extruder, is preferably an elastomer. Any polymer that has elastomeric properties and that can be introduced into an extruder can be used as elastomer here. It is also possible to use a mixture of various elastomers.

Known examples of these elastomers are polymers of conjugated dienes, for example butadiene, with an exterior graft shell based on a vinylaromatic compound, an example being SAN copolymer.

There are also known graft rubbers based on crosslinked polymers made of C1- to C12-alkyl esters of acrylic acid, for example n-butyl acrylate or ethylhexyl acrylate, grafted with polymers based on vinylaromatic compounds, an example being SAN copolymer. There are also familiar graft rubbers comprising in essence a copolymer made of conjugated dienes and of C1- to C12-alkyl acrylates, for example a butadiene-n-butyl acrylate copolymer, and an exterior graft made of SAN copolymer, polystyrene or PMMA. The production of these graft rubbers by the conventional processes, in particular by emulsion polymerization or suspension polymerization, is known.

The first component of the thermoplastic molding composition, introduced in the addition section of the feed zone of the extruder is preferably a rubber. In particular, the rubber here is particulate. Particular preference is given to rubbers having a grafted-on shell made of other, generally non-elastomeric, polymers. In a preferred embodiment of the invention, the graft rubbers introduced as partially dewatered material into the extruder comprise up to 50% by weight of residual water, particularly preferably from 25% by weight to 40% by weight.

It is also possible to use graft rubbers having a two- or multistage structure where the elastomeric graft bases or graft stages are obtained via polymerization of one or more of the monomers butadiene, isoprene, chloroprene, styrene, alkylstyrene, C1- to C12-alkyl esters of acrylic acid or of methacrylic acid, and also of small quantities of other monomers, which may also be crosslinking monomers, and where the hard graft stages are polymerized from one or more of the monomers styrene, alkylstyrene, acrylonitrile, and methyl methacrylate.

Preference is given to graft particles made of polymers based on butadiene/styrene/acrylonitrile, n-butyl acrylate/styrene/acrylonitrile, butadiene/n-butyl acrylate/styrene/acrylonitrile, n-butyl acrylate/methyl methacrylate, n-butyl acrylate/styrene/methyl methacrylate, butadiene/styrene/acrylonitrile/methyl methacrylate and butadiene/n-butyl acrylate/methyl methacrylate/styrene/acrylonitrile. Polymerized into core or shell, there can be up to 10% by weight of polar monomers bearing functional groups, or else crosslinking monomers.

For the production of acrylonitrile-butadiene-styrene (ABS), a rubber comprising polybutadiene is introduced in the addition section of the feed zone of the extruder. An SAN-grafted polybutadiene can in particular be used here.

For the production of acrylonitrile-styrene-acrylate (ASA), a rubber comprising an acrylate, e.g. butyl acrylate, is introduced in the addition section of the feed zone of the extruder. However, it is also possible by way of example to use an SAN-grafted alkyl acrylate.

The second component of the thermoplastic molding composition, which is introduced into the input section of the feed zone of the extruder, is preferably a thermoplastic polymer (as matrix), for example styrene-acyrlonitrile copolymer (SAN), polystyrene, polymethyl methacrylate, polyvinyl chloride, polyamide (e.g. Terblend®) or a mixture of these polymers.

Other suitable thermoplastic polymers are polycarbonates, polyalkylene terephthalates such as polybutylene terephthalate and polyethylene terephthalate, polyoxymethylene, polymethyl methacrylate, polyphenylene sulfide, polysulfones, polyether sulfones and polyamides, and mixtures of these thermoplastics. It is moreover also possible to use thermoplastic elastomers, for example thermoplastic polyurethane (TPU).

It is equally possible to use, as second component, on copolymers based on styrene/maleic anhydride, on styrene/imidated maleic anhydride, on styrene/maleic anhydride/imidated maleic anhydride, on styrene/methyl methacrylate/imidated maleic anhydride, on styrene/methyl methacrylate, on styrene/methyl methacrylate/maleic anhydride, on methyl methacrylate/imidated maleic anhydride, on styrene/imidated methyl methacrylate, on imidated PMMA, on or a mixture of these polymers.

In all of the thermoplastic polymers mentioned, some or all of the styrene can be replaced by alpha-methylstyrene, or by ring-alkylated styrenes, or by acrylonitrile. Particularly suitable thermoplastic polymers among the abovementioned are those based on alpha-methylstyrene/acrylonitrile, styrene/maleic anhydride, styrene/methyl methacrylate and copolymers with imidated maleic anhydride.

It is preferable that the second component of the thermoplastic molding composition, introduced in the input section of the feed zone of the extruder, is a styrene-acrylonitrile copolymer (SAN).

It is preferable that the second component is introduced as melt in the input section of the feed zone of the extruder.

Thermoplastic polymers that can be used as second component are preferably produced by continuous bulk or solution polymerization, where the resultant melt, optionally after removal of the solvents, is continuously introduced directly into the input section of the feed zone of the extruder, for example by a melt pump. However, production by emulsion polymerization, suspension polymerization or precipitation polymerization is also possible, where the polymer is separated from the liquid phase in an additional operation step. Details of the production processes are described by way of example in Kunststoffhandbuch, eds. R. Vieweg and G. Daumiller, vol. V, "Polystyrol" [Polystyrene], Carl-Hanser-Verlag, Munich, 1969, pp. 118 to 124.

The process of the invention produces a thermoplastic molding composition which on discharge from the discharge zone of the extruder causes no, or negligible, blockage of the perforations of the pelletizing die, and which has no visible salt specks on its surface. The invention also provides the molding compositions and moldings, and a device for carrying out the process.

Embodiments of the invention are explained in more detail on the basis of the drawing below, of the description below and of the claims.

FIG. 1: is a diagrammatic sectional depiction of an extruder.

An extruder 10 depicted diagrammatically in FIG. 1 is configured here as twin-screw extruder. The extruder 10 here has two extruder screws rotating around parallel axes.

The two extruder screws here are arranged within an elongate barrel of the extruder 10. The extruder 10 serves for the production of thermoplastic molding compositions, in particular acrylonitrile-butadiene-styrene (ABS) or acrylonitrile-styrene-acrylate (ASA).

In the direction of conveying, viewed in downstream direction, the extruder 10 has an addition section 22, a squeeze section 24, an input section 26, a mixing section 30, a venting section 40 and a discharge zone 50. The individual sections and zones of the extruder 10 here have barrel sections connected to one another by means of flanges.

The addition section 22 of the extruder 10 serves for the introduction of a water-containing first component of the required thermoplastic molding composition. The squeeze section 24 of the extruder 10 serves for the partial dewatering of the first component of the thermoplastic molding composition. The input section 26 of the extruder 10 serves for the introduction of a second component of the required thermoplastic molding composition.

The squeeze section 24 here is not essential. The dewatering can also by way of example take place in the mixing section 30. The input section 26 is moreover not essential. The second component of the thermoplastic molding composition can also be introduced into the extruder 10 together with the first component of the thermoplastic molding composition in the addition section 22.

The addition section 22, the squeeze section 24 and the input section 26 together form a feed zone 20 of the extruder 10. The feed zone 20 here has, with the addition section 22 and the input section 26, two sections for the introduction of components of the required thermoplastic molding composition. It is also possible that the feed zone 20 has only one such section serving for the introduction of all of the components of the required thermoplastic molding composition. The feed zone 20 of the extruder 10 therefore serves for the introduction of the water-containing thermoplastic molding composition.

The mixing section 30 of the extruder 10 serves for the mixing of the thermoplastic molding composition. During the mixing procedure, water present in the thermoplastic molding composition is also evaporated. The venting section 40 of the extruder 10 has a venting aperture through which water vapor can escape, thus being removed from the thermoplastic molding composition.

The discharge zone 50 of the extruder 10 serves for the discharge of the thermoplastic molding composition from the extruder 10. For this, the discharge zone 50 has a pelletizing die 60 which has a plurality of perforations. When the thermoplastic molding composition is discharged from the discharge zone 50 here, it is forced through the perforations of the pelletizing die 60. The discharge zone 50 can also have a die plate instead of the pelletizing die 60.

The addition section 22, the squeeze section 24, the input section 26, the mixing section 30, the venting section 40 and the discharge zone 50 respectively have barrel sections which can be temperature-controlled, in particular can be heated, by means of external temperature-controlled equipment not depicted here. Said external equipment here can be electrically operated heating equipment or else heating equipment through which a liquid flows, or else cooling equipment.

The mixing section 30 here has a first mixing barrel section 31 and a second mixing barrel section 32. The first mixing barrel section 31 of the mixing section 30 here is situated upstream and adjoins the input section 26. The second mixing barrel section 32 of the mixing section 30 is situated downstream and adjoins the venting section 40.

The individual items of external temperature-control equipment here can be operated independently of one another. It is therefore possible to heat or cool the barrel sections of individual sections or zones of the extruder 10 in a controlled manner, while simultaneously there is no temperature-control of barrel sections via other sections or zones of the extruder 10. In particular, the first mixing barrel section 31 and the second mixing barrel section 32 of the mixing section 30 can be temperature-controlled independently of one another.

For the production of the thermoplastic molding composition, the first component of the required thermoplastic molding composition, which comprises water, is introduced into the addition section 22 of the extruder 10. The first component here is a particulate rubber which has from 1 to 40% by weight water content, preferably from 20 to 35% by weight, in particular about 30% by weight.

The rubber introduced into the addition section 22 is transported by the twin-screw system of the extruder 10 into the squeeze section 24. Partial dewatering of the rubber takes place in the squeeze section 24. The barrel section of the squeeze section 24 here is temperature-controlled, in particular cooled, by means of the temperature-control equipment not depicted.

The second component of the required thermoplastic molding composition is introduced into the input section 26 of the extruder 10. The second component here is styrene-acyrlonitrile copolymer (SAN).

The styrene-acrylonitrile copolymer (SAN) here is introduced as melt into the input section 26. The barrel section of the input section 26 here is heated by means of the heating equipment not depicted.

The rubber here is transported by the twin-screw system of the extruder 10 from the squeeze section 24 into the input section 26 and mixed with the styrene-acrylonitrile copolymer (SAN) introduced into the input section 26 to give the thermoplastic molding composition. The thermoplastic molding composition is transported onward by the twin-screw system of the extruder 10 from the input section 26 into the mixing section 30. Further mixing of the thermoplastic molding composition takes place in the mixing section 30 of the extruder 10.

The measured temperature of the thermoplastic molding composition within the mixing section 30 here is about 230° C. During the further mixing in the mixing section 30 of the extruder 10, water still present in the thermoplastic molding composition is evaporated. The water vapor produced by the evaporation passes out of the extruder 10 through a venting aperture provided in the venting section 40. The water vapor produced by the evaporation is thus removed from the thermoplastic molding composition.

The thermoplastic molding composition is transported onward by the twin-screw system of the extruder 10 from the mixing section 30 into the venting section 40, where the water vapor produced is discharged from the extruder 10 through the venting aperture.

From the venting section 40, the thermoplastic molding composition is transported onward by the twin-screw system of the extruder 10 to the discharge zone 50. In the discharge zone 50 the thermoplastic molding composition is discharged from the extruder 10. The thermoplastic molding composition is forced out of the extruder 10 through the perforations in the pelletizing die 60.

The thermoplastic molding composition discharged from the extruder 10 is then pelletized in a pelletizer unit not depicted here. The pelletization here preferably takes the form of underwater pelletization. In this procedure, the filaments emerging from the perforations 60 on the pelletizing die 50 are chopped to a prescribed length by means of a rotating blade. The blade, and also the emerging filaments, are located here in a water chamber. The chopping procedure thus produces pellets. It is also possible, as an alternative, to carry out strand pelletization in a water bath. The examples and claims provide explanation of the invention.

In a process known from the prior art for the production of a thermoplastic molding composition, the first mixing barrel section 31 and the second mixing barrel section 32 of the mixing section 30 are heated to a temperature of about 240° C. This gives an average operating time of 15 days. The operating time here is the time during which the extruder 10 produces the thermoplastic molding composition without interruption.

The operating time here ends when the perforations in the pelletizing die 60 or the perforations in the die plate of the extruder 10 are to some extent or entirely blocked, and the pelletizing die 60 or the die plate requires cleaning.

In a first experiment for the production of a thermoplastic molding composition, the first mixing barrel section 31 of the mixing section 30 is heated to a temperature of about 240° C. The second mixing barrel section 32 is operated adiabatically. This gives an operating time of about 30 days.

In a second experiment for the production of a thermoplastic molding composition, the second mixing barrel section 32 of the mixing section 30 is heated to a temperature of about 240° C. The second mixing barrel section 31 is operated adiabatically. This likewise gives an operating time of 30 days.

In a third experiment for the production of a thermoplastic molding composition, the first mixing barrel section 31 and the second mixing barrel section 32 of the mixing section 30 are operated adiabatically. This gives an operating time of 40 days.

In a fourth experiment for the production of a thermoplastic molding composition, the first mixing barrel section 31 of the mixing section 30 is temperature-controlled to a temperature of about 200° C. The second mixing barrel section 32 is likewise temperature-controlled to a temperature of about 200° C. This gives an operating time of 45 days. In a fifth experiment for the production of a thermoplastic molding composition, the first mixing barrel section 31 of the mixing section 30 is temperature-controlled to a temperature of about 200° C. The second mixing barrel section 32 is temperature-controlled to a temperature of about 240° C. This gives an operating time of 40 days.

LIST OF REFERENCE SIGNS

10 Extruder
20 Feed zone
22 Addition section
24 Squeeze section
26 Input section
30 Mixing section
31 First mixing barrel section
32 Second mixing barrel section
40 Venting section
50 Discharge zone
60 Pelletizing die

What is claimed is:

1. A process for producing a thermoplastic molding composition by an extruder, comprising:
    at least one feed zone,
    at least one mixing section,
    at least one venting section, and
    at least one discharge zone,
    wherein:
        a water-containing first component of the thermoplastic molding composition and a second component of the thermoplastic molding composition are introduced in the at least one feed zone,
        the thermoplastic molding composition is mixed and water present is evaporated in the at least one mixing section,
        water vapor is removed from the thermoplastic molding composition in the at least one venting section, and
        the thermoplastic molding composition is discharged in the at least one discharge zone, and
    wherein:
        at least one mixing barrel section of the mixing section is maintained at a temperature which is the same as or lower than the temperature of the thermoplastic molding composition within the mixing section,
        a first mixing barrel section and/or a second mixing barrel section is/are operated adiabatically, and
        at least one barrel section of the venting section is heated by temperature-control equipment in a manner such that the temperature of the at least one barrel section of the venting section is higher than the temperature of at least one mixing barrel section, and/or
        at least one barrel section of the discharge zone is heated by temperature-control equipment in a manner such that the temperature of the at least one barrel section of the discharge zone is higher than the temperature of at least one mixing barrel section.

2. The process of claim 1, wherein the temperature at which at least one mixing barrel section is maintained is lower by at least 10 K than the temperature of the thermoplastic molding composition within the mixing section.

3. The process of claim 1, wherein at least one barrel section of the feed zone is heated by temperature-control equipment in a manner such that the temperature of the at least one barrel section of the feed zone is higher than the temperature of at least one mixing barrel section.

4. The process of claim 1, wherein the water-containing first component of the thermoplastic molding composition and the second component of the thermoplastic molding composition are introduced together in the feed zone.

5. The process of claim 1, wherein:
    the at least one feed zone comprises:
        at least one addition section,
        at least one squeeze section, and
        at least one input section,
    wherein:
        the water-containing first component of the thermoplastic molding composition is introduced in the at least one addition section,
        the water-containing first component of the thermoplastic molding composition is to some extent dewatered in the at least one squeeze section, and
        the second component of the thermoplastic molding composition is introduced in the at least one input section.

6. The process of claim 5, wherein at least a portion of a barrel section of the input section is heated by temperature-control equipment in a manner such that the temperature of the portion of the barrel section of the input section is higher than the temperature of at least one portion of the mixing barrel section.

7. The process of claim 5, wherein the water-containing first component introduced in the at least one addition section is a rubber.

8. The process of claim 7, wherein the rubber comprises at least one polybutadiene.

9. The process of claim 7, wherein the rubber comprises at least one acrylate rubber.

10. The process of claim 5, wherein the second component introduced in the at least one input section is a styrene-acrylonitrile copolymer (SAN).

11. The process of claim 5, wherein the second component is introduced as melt in the at least one input section.

12. The process of claim 2, wherein the temperature at which at least one mixing barrel section is maintained is lower by at least 20 K than the temperature of the thermoplastic molding composition within the mixing section.

13. The process of claim 9, wherein the rubber comprises at least one butyl acrylate rubber.

* * * * *